(12) United States Patent
Whiteside et al.

(10) Patent No.: US 11,831,819 B2
(45) Date of Patent: Nov. 28, 2023

(54) MEDIA ATTRIBUTION

(71) Applicant: Global Media Group Services Limited, London (GB)

(72) Inventors: Liam Whiteside, London (GB); Eleanor Marshall, London (GB)

(73) Assignee: GLOBAL MEDIA IP LIMITED, London (GB)

( * ) Notice: Subject to any disclaimer, the term of this patent is extended or adjusted under 35 U.S.C. 154(b) by 0 days.

(21) Appl. No.: 16/979,406

(22) PCT Filed: Mar. 12, 2019

(86) PCT No.: PCT/GB2019/050684
§ 371 (c)(1),
(2) Date: Sep. 9, 2020

(87) PCT Pub. No.: WO2019/175562
PCT Pub. Date: Sep. 19, 2019

(65) Prior Publication Data
US 2021/0084348 A1    Mar. 18, 2021

(30) Foreign Application Priority Data
Mar. 12, 2018 (GB) ..................... 1803928

(51) Int. Cl.
*H04N 21/218* (2011.01)
*H04N 21/24* (2011.01)
(Continued)

(52) U.S. Cl.
CPC . *H04N 21/23424* (2013.01); *H04N 21/25866* (2013.01); *H04N 21/812* (2013.01)

(58) Field of Classification Search
None
See application file for complete search history.

(56) References Cited

U.S. PATENT DOCUMENTS

| 9,723,372 B1 | 8/2017 | McLean et al. |
| 2009/0013347 A1 | 1/2009 | Ahanger |

(Continued)

FOREIGN PATENT DOCUMENTS

| WO | WO-02/03227 A2 | 1/2002 |
| WO | WO-02/09009 A1 | 1/2002 |

OTHER PUBLICATIONS

International Search Report prepared by EPO dated May 13, 2019 as ISA re International Patent Application No. PCT/GB2019/050684.

(Continued)

*Primary Examiner* — Brian T Pendleton
*Assistant Examiner* — Jean D Saint Cyr

(57) ABSTRACT

A method for streaming media from a computer-implemented media streaming system, the method comprising: receiving a primary media stream; receiving a plurality of items of interstitial content, each item being associated with content information specifying the content of the respective item; combining the items of interstitial content with the primary media stream to form a playout media stream; streaming the playout media stream to an identifiable media consumer over a publicly accessible communications network; and storing data associating (i) the content information of the interstitial content in the media stream streamed to the consumer with (ii) other media consumed by or activities of the same computer or person.

17 Claims, 1 Drawing Sheet

(51) Int. Cl.
    *H04N 21/25*     (2011.01)
    *H04N 21/258*    (2011.01)
    *H04N 21/442*    (2011.01)
    *H04N 21/61*     (2011.01)
    *H04N 21/234*    (2011.01)
    *H04N 21/81*     (2011.01)

(56) References Cited

U.S. PATENT DOCUMENTS

| | | |
|---|---|---|
| 2010/0287026 A1 | 11/2010 | Smith |
| 2013/0305297 A1* | 11/2013 | Jabara ................ H04N 21/2365 |
| | | 725/75 |
| 2014/0020017 A1 | 1/2014 | Stern et al. |
| 2014/0278972 A1 | 9/2014 | Yonebahashi et al. |
| 2014/0324447 A1 | 10/2014 | Dittus |
| 2015/0382042 A1* | 12/2015 | Wagenaar ........ H04N 21/25891 |
| | | 725/34 |
| 2017/0076007 A1 | 3/2017 | Knoll et al. |
| 2017/0200199 A1 | 7/2017 | O'Reilly |
| 2018/0241981 A1* | 8/2018 | Berger ................ H04N 9/8205 |
| 2019/0268650 A1* | 8/2019 | Avedissian ............ G06F 3/0481 |
| 2021/0219021 A1* | 7/2021 | O'Neil ............... H04N 21/4667 |

OTHER PUBLICATIONS

UK Patent Office Search Report under Section 17(5)(b) dated Aug. 5, 2019 re United Kingdom Patent Application No. GB1803928.9.

* cited by examiner

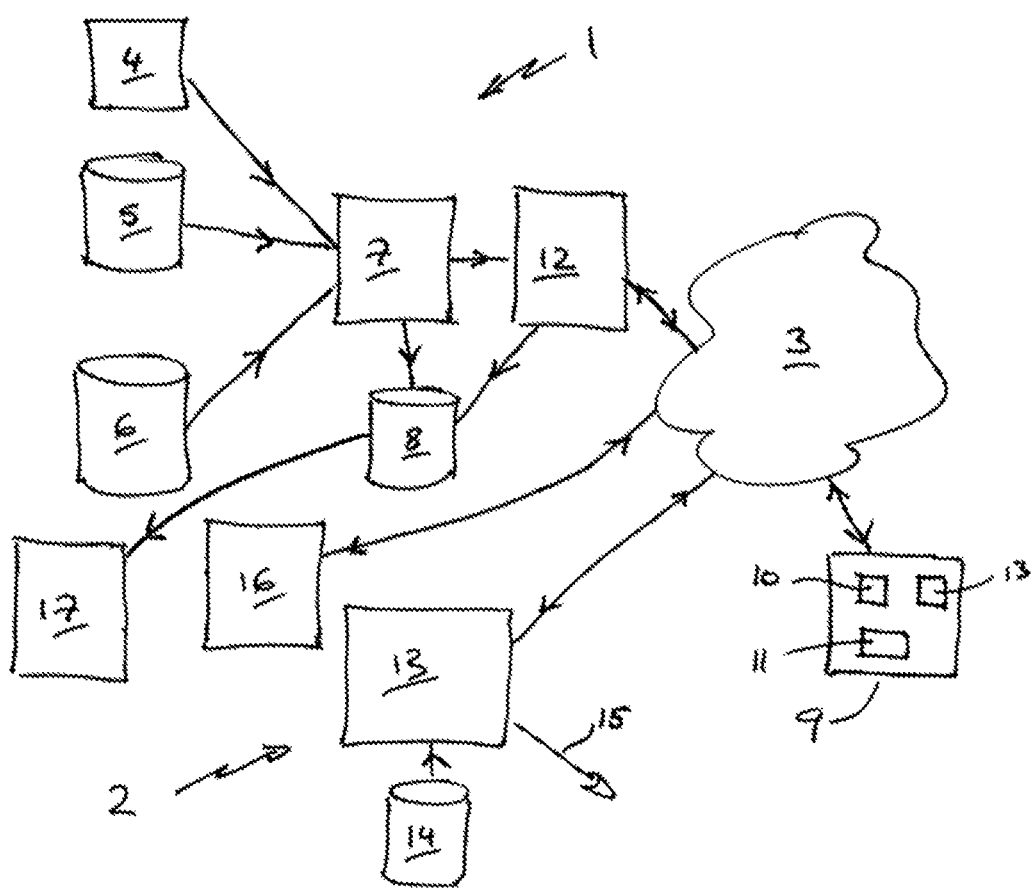

MEDIA ATTRIBUTION

CROSS-REFERENCE TO RELATED APPLICATIONS

The present application claims priority to and is the 35 U.S.C. 371 United States National Phase application based on International Patent Application No. PCT/GB2019/050684, filed on Mar. 12, 2019, and entitled "Media Attribution", which claims priority to the United Kingdom Patent Application No. GB 1803928.9, filed on Mar. 12, 2018 and entitled "Media Attribution", the disclosures which are incorporated herein by reference in their entireties.

BACKGROUND OF THE INVENTION

This invention relates to attributing associations between streamed media content and other activities.

Nowadays, media streams such as radio and television stations can be consumed in many ways. An audience member may listen to or watch live programming by receiving an over-the-air broadcast signal through a radio or television receiver, or by receiving a data stream over the internet and playing that data stream through a suitable device, such as a smartphone, tablet or dedicated media player.

Commercial radio and television is often supported by advertising. The advertising is presented during commercial breaks in the primary programming.

When a user visits a website using a web browser, it is common for the website to set a cookie on the user's browser. The cookie is a data unit stored on the user's computer which is associated with the website and contains content specified by the website. When the user subsequently visits the website the cookie can be recalled by the server from the user's computer. The data contained in the cookie could, for example, be an identity. This allows the website to establish when a particular user returns to a website.

Some websites incorporate cookies from other domains. These may be domains which track individual users on multiple websites. This approach allows analysts to monitor associations between a user's behaviour on different websites. For example, a user might visit a website presenting an advert for a product, and may subsequently visit another website to purchase that product. Analysis of the user's cookies may allow this behaviour to be detected, which may lead to the operator of the website that presented the advert being paid, or may guide a decision as to which advertisements to show on the first website in the future.

It would be desirable to be able to establish a similar association in respect of advertisements presented in streamed media, for example audio or video streams.

SUMMARY OF THE INVENTION

According to the present invention there is provided a method for streaming media from a computer-implemented media streaming system, the method comprising: receiving a primary media stream; receiving a plurality of items of interstitial content, each item being associated with content information specifying the content of the respective item; combining the items of interstitial content with the primary media stream to form a playout media stream; streaming the playout media stream to an identifiable media consumer over a publicly accessible communications network; and storing data associating (i) the content information of the interstitial content in the media stream streamed to the consumer with (ii) the media consumer.

The media consumer may be a physical device such as a personal computer, tablet or smartphone. The media consumer may be a user of such a device. The user may be authenticated to the device by security credentials. The stored data may associate the content information of the interstitial content in the media stream streamed to the consumer with, for example, other media consumed by the media consumer or other activities of the media consumer.

The step of combining the items of interstitial content with the primary media stream may comprise inserting the interstitial content in interruptions in the primary media stream.

The step of combining the items of interstitial content with the primary media stream may comprise overlaying the interstitial content on portions of the primary media stream.

The media consumer may be a media playback device. The media consumer may be a media playback device associated with a defined user identity. The user identity may be the identity of a user who is authenticated to the media playback device.

The said storing step may comprise: (i) generating a unique identity for the consumer and (ii) causing the unique identity to be stored at the consumer. It may further comprise: (iii) storing remotely from the consumer history data associating the unique identity with the content information of the interstitial content in the media stream streamed to the consumer.

The said storing step may comprise: (i) gathering from the consumer information indicative of the state of the consumer whereby the consumer can be heuristically identified; and (ii) storing remotely from the consumer history data comprising that received information in association with the content information of the interstitial content in the media stream streamed to the consumer.

The said storing step may comprise causing history data comprising the content information of the interstitial content in the media stream streamed to the consumer to be stored at the consumer.

The method may comprise, subsequent to the said streaming and storing steps, performing the steps of: communicating with the media consumer to perform a transaction; and associating the transaction with the content information of the interstitial content in the media stream streamed to the consumer.

The step of streaming the playout media stream may be performed at a first computer. The step of communicating with the media consumer to perform the transaction may be performed at a second computer.

The step of associating the transaction may comprise: receiving the unique identity from the consumer; and correlating the received unique identity with the history data.

The step of associating the transaction may comprise: gathering from the consumer information indicative of the state of the consumer whereby the consumer can be heuristically identified; and correlating that received information with the history data.

The method may comprise the second computer receiving the history information from the consumer.

The step of streaming the playout media stream may be performed using a packet streaming mechanism.

The primary media stream may be an audio or video programme.

The interstitial items may be advertisements.

BRIEF DESCRIPTION OF THE DRAWING

The present invention will now be described by way of example with reference to the accompanying drawing. In the drawing:

FIG. 1 shows a system including an arrangement for playing out advertisements to radio listeners and an arrangement for serving web pages to users.

DETAILED DESCRIPTION

The system of FIG. 1 includes a media playout system shown generally at 1 and a web-serving system shown generally at 2.

The media playout system is configured to stream media to consumers over the internet 3. In this example the media is audio media such as radio programming, but it could be video media or multimedia streaming content. The media playout system comprises a media source. The media source provides the primary programming of the media to be streamed. The primary programming could be generated live in a studio 4 or from the location of a live event such as a sports stadium. Alternatively, the primary programming could have been pre-generated, in which case it can be stored in a media store 5. An advertisement store 6 stores commercial programming such as advertisements. Each advertisement is a media element, and has associated with it metadata which indicates the identity of the advertisement or an attribute of the advertisement that is to be used for tracking purposes, for example the nature of the subject of the advertising or the identity of the provider of the product or service that is the subject of the advertising. A management suite 7 has access to the primary programming and the stored advertisements. The management suite collates the primary programming and the advertisements to generate a datastream that is to be streamed to one or more users. The management suite may intersperse one or more advertisements retrieved from the advertisement store into the primary programming in order to create the datastream to be played out. The datastream may be played out from its start at a time when it is requested by a consumer (in other words, it may be played out on demand), or it may be played out with a predetermined start time that is independent of when it is requested by a consumer.

Different datastreams may be provided to different consumers for the same primary content. For example, different advertisements may be inserted for different consumers, or some consumers may receive the primary content without advertisements. The management suite 7 stores in a history database 8 an indication of which advertisements have been played to which consumers. This may be done by directly storing a record of the advertisements played to each customer or by storing a record of which advertisements were included in each datastream and which datastreams were sent to each customer. The history data stored in the history database may specify an advertisement by reference to metadata of that advertisement stored in the database 6. That may be a unique identity of the advertisement or an indication of the subject or promotor of the advertisement.

Instead of advertisements other interstitial media content could be stored and presented in the same way: for example public service announcements, short documentaries or artistic content.

The datastreams to be played out are passed from the management suite 7 to a media server 12. The media server 12 encodes each datastream into a suitable digital format and transmits it over the internet 3 to any devices that have requested it. An example of such a device is computer 9. Computer 9 receives the media feed, a processor 10 of the computer 9 decodes the media feed to audio and/or video data and a user interface 11 of the computer 9 plays out that audio data. The user interface could, for example include a loudspeaker and/or a display. The computer may be a desktop or laptop computer, a smartphone, a tablet, a dedicated media playback device or any other suitable computing device.

In operation, a user of the computer 9 who wishes to receive a media playback causes the computer to connect to the media server 12 over the internet 3. The user may have to log in to the media server by providing suitable credentials. The media server transmits to the computer a set of data defining media that is available to be streamed. This may take the form of a program guide. The computer 9 may present the list to the user on the user interface 11. The user can then select an item of media for streaming. The computer transmits the user's selection to the media server 12. The media server requests the selected data from the management suite 7. The management suite acquires the primary content relating to the selected data and forms a playout stream by interspersing advertisements in the playout stream. It provides the playout stream to the media server 12, which transmits it over the internet 3 to the computer 9. The processor 10 of the computer 9 converts the received data to a suitable format and causes it to be played out over the user interface 11.

The selection and reception of the media stream at the computer 9 may be performed by means of software running on the computer. That software may take any suitable form. One convenient form is for the software to be a web browser, and the communication between the computer 9 and the media server 12 to be performed over a web interface, e.g. using the HTTP or HTTPS protocols. Another convenient form is for the software to be a dedicated application for media playback.

The media server 12 causes (i) information regarding the identity of computer 9 or of a user of it to be associated with (ii) information indicating the identity or nature of advertisements (or other interstitial media content) presented computer 9 or the user of it. This may be done in a number of ways. For example:
1. The media server 12 may cause the computer 9 to store a cookie or another non-transient data unit in memory 13 of computer 9. The data unit may be set by media server 12 or may be a third-party cookie set by another server, e.g. a web server of a tracking service. The data unit may contain a unique identity whereby the computer 9 and/or a user of it can be identified. The media server 12 may store in database 8 (or elsewhere) data indicating which interstitial media content has been provided to the consumer having that identity.
2. The media server may request from computer 9 information that identifies the computer or its user. An individual item of that information may identify the user by itself or in combination with other such items of information. In one example, the requested information may be credentials for a user of the computer 9, for example a user identity and a password. In another example, the requested information may be a unique identity of the computer such as a unique identity associated with the computer's hardware: for example a serial number or an IMEI associated with a cellular network on which the computer 9 is operative. In another example, the requested information may be a set of information that together provides a statistical level of confidence that it uniquely identifies the computer 9. Examples of such information might be the default language in use on the computer, the processor type of the computer, the memory available on the computer, a list of applications installed on the computer and the version of web browser being used. Together, such data might uniquely identify the computer. Having received such identifying information from the computer, the media server 12 may store in database 8 (or elsewhere) data indicating which interstitial media content has been provided to the consumer having that identity.

3. The media server 12 may cause the web browser to store a cookie or another non-transient data unit in memory 13 of computer 9. The data unit may be set by media server 12 or may be a third-party cookie set by another server, e.g. a web server of a tracking service. The data unit may contain data listing which interstitial programming has been provided to the computer 9. In this case, the media server 12 does not need to store data indicating which interstitial media content has been provided to the computer.

Thus, the computer 9 consumes a media stream (e.g. an audio and/or video stream) from the media playout system. The media feed contains interstitial media content such as advertisements. The system is configured such that a record of the advertisements provided to the computer 9 in the media stream is stored.

At a subsequent time, a user of the computer 9 may access another server 13 over the internet 3. That other server could be a web server. It could operate a commerce site such as an online shop or store, by means of which products or services can be acquired or consumed. The server 13 has access to a data store 14 which holds the content to be provided by the server 13. That may, for example, be information defining a set of web pages to be served by the server 13, how to take payment for products or services, and how to initiate the supply of products or services once payment has been made.

When computer 9 or a user of it accesses server 13, server 13 instructs computer 9 to report information to server 16 including the consumer identity and what content it was accessing from server 13. Computer 9 transmits to the server 16 one or more messages indicating the content it was accessing from the server. The content may be identified in that/those messages by its address (e.g. URL) or another identity such as its title or a unique reference by which the content is designated on server 13. Server 16 adds this to the history in database 8.

The server 17 can then use the information in the database 8 to correlate the information from activities performed by computer 9 or its user on the server 13 with the information of what computer 9 or its user have consumed from the media server 12. For example, it may correlate instances of the presentation of an advertisement for a certain product with an action to purchase that product, or to purchase a rival product.

It will be appreciated that elements described above may be implemented in different ways. For example, the functions of each of the servers 7, 12, 13, 16 and the databases 5, 6, 8, 14 may be combined together or divided up in any convenient way. Each of the servers and/or databases could be provided by a respective hardware device. Alternatively, they could be coalesced physically in any convenient combination. The servers and the databases may communicate directly or over a network. Each server may comprise a processor and a program memory storing in a non-transient way program code executable by the processor to cause the server to perform functions described herein.

There may be multiple clients 9 connected to and receiving streamed media from the media server 12 simultaneously.

The interstitial media content could interrupt the primary programming or could be overlain in or on it, for example as subtitles, a voiceover on a music stream or as a picture-in-picture element on a video stream.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method for streaming media from a computer-implemented media streaming system, the method comprising:
   receiving a primary media stream;
   receiving a plurality of items of interstitial content, each item being associated with content information specifying the content of the respective item;
   combining the items of interstitial content with the primary media stream to form a playout media stream;
   streaming the playout media stream to an identifiable media consumer over a publicly accessible communications network; and
   storing history data associating the content information of the interstitial content in the media stream streamed to the media consumer with the media consumer, the media consumer being a media playback device, and the history data being stored remotely from the media playback device;
   subsequent to the streaming and the storing:
      receiving information, from a remote server, including an identity of the media consumer and an activity performed by the media consumer, the activity including accessing content from the remote server; and
      determining, based on correlating the information of the content accessed from the remote server with the content information of the interstitial content streamed to the media consumer, a causal association between the content information of the interstitial content streamed to the media consumer stored in the history data and the subsequent activity performed by the media consumer at the remote server.

2. The method as claimed in claim 1, wherein the combining the items of interstitial content with the primary media stream further comprises inserting the interstitial content in interruptions in the primary media stream.

3. The method as claimed in claim 1, wherein the combining the items of interstitial content with the primary media stream comprises overlaying the interstitial content on portions of the primary media stream.

4. The method as claimed in claim 1, wherein the media consumer is a media playback device associated with a defined user identity.

5. The method as claimed in claim 1, wherein the storing further comprises:
generating a unique identity for the media consumer;
causing the unique identity to be stored at the media consumer;
wherein the stored history data associates the unique identity with the content information of the interstitial content in the media stream streamed to the media consumer.

6. The method as claimed in claim 1, wherein the storing further comprises:
gathering from the media consumer information indicative of the state of the media consumer whereby the media consumer can be heuristically identified;
wherein the stored history data includes the gathered information in association with the content information of the interstitial content in the media stream streamed to the media consumer.

7. The method as claimed in claim 1, wherein the storing further comprises causing the history data to be stored at the media consumer.

8. The method as claimed in claim 1, further comprising, subsequent to the streaming and the storing,
communicating with the media consumer to perform a transaction;
wherein determining the causal association includes associating the transaction with the content information of the interstitial content in the media stream streamed to the media consumer.

9. The method as claimed in claim 8, wherein the streaming the playout media stream is performed at a first computer, and the communicating with the media consumer to perform the transaction is performed at a second computer.

10. The method as claimed in claim 8, wherein the storing further comprises:
generating a unique identity for the media consumer;
causing the unique identity to be stored at the media consumer; and
storing remotely from the media consumer history data associating the unique identity with the content information of the interstitial content in the media stream streamed to the media consumer;
wherein the associating the transaction further comprises:
receiving the unique identity from the media consumer; and
correlating the received unique identity with the history data.

11. The method as claimed in claim 8, wherein the storing further comprises:
gathering from the media consumer information indicative of the state of the media consumer whereby the media consumer is configured to be heuristically identified; and
storing remotely from the media consumer history data comprising the gathered information in association with the content information of the interstitial content in the media stream streamed to the media consumer;
wherein the associating the transaction further comprises:
gathering from the media consumer information indicative of the state of the media consumer whereby the media consumer can be heuristically identified; and
correlating the gathered information with the history data.

12. The method as claimed in claim 9, wherein the storing further comprises storing history data comprising the content information of the interstitial content in the media stream streamed to the media consumer at the media consumer;
the method further comprising
receiving, by the second computer, the history information from the media consumer.

13. The method as claimed in claim 1, wherein the streaming the playout media stream is performed using a packet streaming mechanism.

14. The method as claimed in claim 1, wherein the primary media stream is an audio or video program.

15. The method as claimed in claim 1, wherein the interstitial items include advertisements.

16. A computer program product comprising a non-transitory machine-readable medium storing instructions that, when executed by at least one programmable processor, cause the at least one programmable processor to perform operations comprising:
receiving a primary media stream;
receiving a plurality of items of interstitial content, each item being associated with content information specifying the content of the respective item;
combining the items of interstitial content with the primary media stream to form a playout media stream;
streaming the playout media stream to an identifiable media consumer over a publicly accessible communications network; and
storing history data associating the content information of the interstitial content in the media stream streamed to the media consumer with the media consumer, the media consumer being a media playback device, and the history data being stored remotely from the media playback device;
subsequent to the streaming and the storing:
receiving information, from a remote server, including an identity of the media consumer and an activity performed by the media consumer, the activity including accessing content from the remote server; and
determining, based on correlating the information of the content accessed from the remote server with the content information of the interstitial content streamed to the media consumer, a causal association between the content information of the interstitial content streamed to the media consumer stored in the history data and the subsequent activity performed by the media consumer at the remote server.

17. A system comprising:
at least one programmable processor; and
a non-transitory machine-readable medium storing instructions that, when executed by the at least one programmable processor, cause the at least one programmable processor to perform operations comprising:
receiving a primary media stream;
receiving a plurality of items of interstitial content, each item being associated with content information specifying the content of the respective item;
combining the items of interstitial content with the primary media stream to form a playout media stream;
streaming the playout media stream to an identifiable media consumer over a publicly accessible communications network; and storing history data associating the content information of the interstitial content in the media stream streamed to the media consumer with the media consumer, the media consumer being a media playback device, and the history data being stored remotely from the media playback device;

subsequent to the streaming and the storing:
receiving information, from a remote server, including an identity of the media consumer and an activity performed by the media consumer, the activity including accessing content from the remote server; and determining, based on correlating the information of the content accessed from the remote server with the content information of the interstitial content streamed to the media consumer, a causal association between the content information of the interstitial content streamed to the media consumer stored in the history data and the subsequent activity performed by the media consumer at the remote server.

\* \* \* \* \*